United States Patent
Zhang et al.

(10) Patent No.: US 12,166,658 B2
(45) Date of Patent: Dec. 10, 2024

(54) BINDING SEGMENT IDENTIFIER PROCESSING METHOD AND DEVICE

(71) Applicant: Huawei Technologies Co., Ltd., Shenzhen (CN)

(72) Inventors: Ka Zhang, Beijing (CN); Chen Zhang, Beijing (CN); Zhibo Hu, Beijing (CN); Sheng Fang, Beijing (CN); Zuliang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/993,571

(22) Filed: Nov. 23, 2022

(65) Prior Publication Data

US 2023/0086279 A1 Mar. 23, 2023

Related U.S. Application Data

(63) Continuation of application No. PCT/CN2021/095024, filed on May 21, 2021.

(30) Foreign Application Priority Data

May 28, 2020 (CN) .......................... 202010470237.1

(51) Int. Cl.
*H04L 45/02* (2022.01)
*H04L 45/00* (2022.01)
(Continued)

(52) U.S. Cl.
CPC .............. *H04L 45/02* (2013.01); *H04L 45/44* (2013.01); *H04L 45/566* (2013.01); *H04L 45/741* (2013.01); *H04L 12/4633* (2013.01)

(58) Field of Classification Search
CPC ... H04L 45/741; H04L 45/44; H04L 12/4633; H04L 45/02
See application file for complete search history.

(56) References Cited

U.S. PATENT DOCUMENTS 11,362,940 B2 6/2022 Peng et al.
11,558,341 B2 1/2023 Shi et al.
(Continued)

FOREIGN PATENT DOCUMENTS

CN 101465847 A 6/2009
CN 109218189 A 1/2019
(Continued)

OTHER PUBLICATIONS

Filsfils, C. et al., "Segment Routing Policy Architecture draft-ietf-spring-segment-routing-policy-05.txt," Spring Working Group, Internet Draft, Intended Status: Standards Track, Expires: May 14, 2020, Microsoft, Nov. 17, 2019, 66 pages.
(Continued)

*Primary Examiner* — Barbara B Anyan
(74) *Attorney, Agent, or Firm* — Slater Matsil, LLP

(57) ABSTRACT

A binding segment identifier processing method and a device are provided. The method includes a network device receives a message sent by a controller, where the message includes type information and a segment identifier, and the type information indicates that the segment identifier is a binding segment identifier BSID. The network device performs a processing action on the BSID based on the type information. According to embodiments of this application, the network device can identify the BSID, to resolve a technical problem that an incorrect processing result is caused when a segment identifier list of the network device includes the BSID.

21 Claims, 7 Drawing Sheets

(51) Int. Cl.
*H04L 45/44* (2022.01)
*H04L 45/741* (2022.01)
*H04L 12/46* (2006.01)

(56) References Cited

U.S. PATENT DOCUMENTS

| | | | |
|---|---|---|---|
| 2013/0337769 A1* | 12/2013 | Bhatia | H04M 15/81 |
| | | | 455/406 |
| 2016/0205536 A1* | 7/2016 | Batchu | H04L 5/0048 |
| | | | 455/558 |
| 2020/0099610 A1 | 3/2020 | Heron et al. | |
| 2020/0382416 A1 | 12/2020 | Hu et al. | |
| 2021/0250292 A1 | 8/2021 | Yao et al. | |
| 2022/0045933 A1* | 2/2022 | Shen | H04L 12/4633 |
| 2022/0141120 A1* | 5/2022 | Dong | H04L 45/44 |
| | | | 370/401 |
| 2023/0044321 A1* | 2/2023 | Lu | H04L 45/741 |

FOREIGN PATENT DOCUMENTS

| | | |
|---|---|---|
| CN | 110661700 A | 1/2020 |
| CN | 110995596 A | 4/2020 |
| CN | 111092801 A | 5/2020 |
| EP | 2230868 A1 | 9/2010 |
| WO | 2018082652 A1 | 5/2018 |
| WO | 2019007390 A1 | 1/2019 |
| WO | 2020063500 A1 | 4/2020 |

OTHER PUBLICATIONS

Filsfils, C. et al., "Sebment Routing Architecture," Internet Engineering Task Force (IETF), Request for Comments: 3402, Category: Standards Track, ISSN: 2070-1721, Google, Inc., Jul. 2018, 32 pages.

Previdi, S. et al., "Advertising Segment Routing Policies in BGP draft-ietf-idr-segment-routing-te-policy-08," Network Working Group, Internet-Draft, Intended status: Standards Track, Expires: May 21, 2020, Juniper Networks, Nov. 18, 2019, 75 pages.

Previdi, S. et al., "IS-IS Extensions for Segment Routing," Internet Engineering Task Force (IETF), Request for Comments: 8667, Category: Standards Track, ISSN: 2070-1721, Orange, Dec. 2019, 17 pages.

Sivabalan, S. et al., "Carrying Binding Label/Segment-ID in PCE-based Networks.draft-sivabalan-pce-binding-label-sid-04" PCE Working Group, Internet-Draft, Intended status: Standards Track, Expires: Sep. 6, 2018, Huawei Technologies, Mar. 5, 2018, 10 pages.

Xiaoming, H. et al., "Study on Segment Routing Network and its Application in Traffic Engineering," Guangzhou Research Institute of China Telecom Co., Ltd., China Telecommunications Corporation, Jun. 2016, 9 pages (English Abstract Only).

Yang, S. et al., "Route Optimization Mechanism Based on Identifier/Locator Split for Nested Mobile Network," School of Eelctronics and Information Engineering, Jul. 2008, 7 pages (English Abstract Only).

* cited by examiner

BINDING SEGMENT IDENTIFIER PROCESSING METHOD AND DEVICE

CROSS-REFERENCE TO RELATED APPLICATIONS

This application is a continuation of International Application No. PCT/CN2021/095024, filed on May 21, 2021, which claims priority to Chinese Patent Application No. 202010470237.1, filed on May 28, 2020. The disclosures of the aforementioned applications are hereby incorporated by reference in their entireties.

TECHNICAL FIELD

The present disclosure relates to the field of communication technologies, and in particular, to a binding segment identifier processing method and a device.

BACKGROUND

Segment routing (SR) is a protocol that is designed based on a concept of source routing and that is used to control data packet forwarding in a network. According to SR, a network path is divided into segments, segment identifiers are allocated to these segments or nodes, and a data packet carries sequentially arranged segment identifiers, so that the data packet can be transmitted through a forwarding path indicated by the segment identifiers. In an SR network, a group of ordered segment identifiers are inserted into a data packet by using an ingress device of the segment routing network to explicitly specify a forwarding path for the data packet. The ingress device may also be referred to as a head node. When SR is applied to an Internet protocol version 6 (IPv6) data plane, the SR is referred to as IPv6-based segment routing (SRv6). When SR is applied to a multi-protocol label switching (MPLS) data plane, the SR is referred to as MPLS-based segment routing (SR-MPLS).

A segment identifier (segment ID, SID) represents a node, a link, or a service provided by a network device. In SRv6, a SID is represented as a 128-bit value. In SR-MPLS, a SID is represented as a label value. A segment identifier in SRv6 may include a function part, and the function part indicates that a network device that publishes the segment identifier needs to perform a corresponding action. For any node in the SR network, the node may include an endpoint three-layer cross-connection segment identifier (End.X SID, where End represents endpoint and means endpoint, X represents crossing and means three-layer cross-connection, and SID means segment identifier) or an endpoint segment identifier (End SID, where End represents endpoint and means endpoint, and SID means segment identifier) corresponding to at least one node. The End.X SID is used to identify an IP layer link directly connected to the node, and the End SID is used to identify the node.

A segment identifier list (Segment ID List, SID list) is a list that includes a group of segment identifiers. After receiving a message, the head node correspondingly inserts one SID list into the message to explicitly indicate a forwarding path.

A binding segment identifier (binding segment ID, BSID) is a special SID. The BSID may correspond to one SID list and indicate one forwarding path, and the SID list includes one or more SIDs. The BSID may be included in one SID list.

In some cases, when a segment identifier list of a network device includes a BSID, the network device cannot identify which SID in the segment identifier list is the BSID. Consequently, incorrect or improper processing is performed on the BSID to obtain an incorrect result.

In conclusion, how to avoid an incorrect processing result that may be caused when a segment identifier list of a network device includes a BSID is a technical problem that needs to be resolved urgently by persons skilled in the art.

SUMMARY

This application discloses a binding segment identifier processing method and a device, to resolve a technical problem that an incorrect processing result is caused when a segment identifier list of a network device includes a BSID.

According to a first aspect, this application provides a binding segment identifier processing method. The method includes:

A network device receives a message sent by a controller, where the message includes type information and a segment identifier, and the type information is used to indicate that the segment identifier is a binding segment identifier BSID; and the network device performs a processing action on the BSID based on the type information. Optionally, the message may be a border gateway protocol (BGP) message, a path computation element protocol (PCEP) message, or the like.

In this application, a type of the BSID is specified in the message, so that the network device can identify the BSID, and can further process the BSID based on the processing action corresponding to the type, thereby avoiding an incorrect processing result caused by incorrect or improper processing performed because the BSID cannot be identified.

In a possible implementation, that the message includes type information is specifically that a type Type field in the message includes the type information.

A new type is defined for the BSID, and the type information is directly included in the type field of the transmitted message, so that the network device can quickly determine that the segment identifier is a binding segment identifier.

In a possible implementation, that the message includes type information is specifically that a flags Flags field in the message includes the type information.

In a possible implementation, the type information occupies at least one bit in the Flags field.

The type information is identified by using the at least one bit in the Flags field included in the message, thereby improving field utilization of the message.

In a possible implementation, that the network device performs a processing action on the BSID based on the type information includes:

The network device checks, based on the type information, whether a route to a device indicated by the BSID exists, and does not check whether the BSID exists in a topology to which the network device belongs; or the network device does not perform failure check on the BSID based on the type information.

To avoid failed data forwarding due to a failure of a forwarding path indicated by a segment identifier list, failure check may be performed on the segment identifier list. For example, accessibility testing may be performed on each SID in the segment identifier list. However, the BSID is not flooded in a network, and there is no BSID-related information in topology information of the network device. Consequently, the network device may consider that the SID is invalid during the failure check (including checking whether the BSID exists in the topology). In this case, a failure is misreported. Therefore, in this application, the type of the BSID is identified, and topology check or failure check is not performed on this type of BSID, thereby avoiding misreporting an alarm, and quickly implementing data forwarding.

In a possible implementation, the message further includes a segment identifier SID, and the SID is a segment identifier of a type different from the type of the BSID; and the method further includes:

The network device checks, based on the type of the SID, whether a route to a device indicated by the SID exists, and checks whether the SID exists in the topology to which the network device belongs.

In this application, whether the forwarding path indicated by the segment identifier list fails is checked, and if the forwarding path indicated by the segment identifier list does not fail, forwarding is smoothly performed, or if the forwarding path indicated by the segment identifier list fails, the forwarding path is switched to a standby forwarding path, to ensure successful data forwarding.

According to a second aspect, this application provides a binding segment identifier processing method. The method includes:

A controller generates a message, where the message includes type information and a segment identifier, and the type information is used to indicate that the segment identifier is a binding segment identifier BSID; and the controller sends the message to a network device, where the message is used to indicate the network device to perform a processing action on the BSID based on the type information. Optionally, the message may be a border gateway protocol BGP message, a path computation element communication protocol PCEP message, or the like.

In this application, the controller specifies a type of the BSID in the delivered message, so that the network device can identify the BSID in a segment routing policy, and can further process the BSID based on the processing action corresponding to the type, thereby avoiding an incorrect processing result caused by incorrect or improper processing performed because the BSID cannot be identified.

In a possible implementation, that the message includes type information is specifically that a type Type field in the message includes the type information.

In a possible implementation, that the message includes type information is specifically that a flags Flags field in the message includes the type information.

In a possible implementation, the type information occupies at least one bit in the Flags field.

According to a third aspect, this application provides a network device. The device includes:

a receiving unit, configured to receive a message sent by a controller, where the message includes type information and a segment identifier, and the type information is used to indicate that the segment identifier is a binding segment identifier BSID; and a processing unit, configured to perform a processing action on the BSID based on the type information.

Optionally, the message may be a border gateway protocol BGP message, a path computation element communication protocol PCEP message, or the like.

In a possible implementation, that the message includes type information is specifically that a type Type field in the message includes the type information.

In a possible implementation, that the message includes type information is specifically that a flags Flags field in the message includes the type information.

In a possible implementation, the type information occupies at least one bit in the Flags field.

In a possible implementation, the processing unit is specifically configured to:

check, based on the type information, whether a route to a device indicated by the BSID exists, and skip checking whether the BSID exists in a topology to which the network device belongs; or skip, based on the type information, performing failure check on the BSID.

In a possible implementation, the message further includes a segment identifier SID, and the SID is a segment identifier of a type different from a type of the BSID; and the device further includes: a check unit, configured to check, based on the type of the SID, whether a route to a device indicated by the SID exists, and check whether the SID exists in the topology to which the network device belongs.

According to a fourth aspect, this application provides a controller. The controller includes:

a generation unit, configured to generate a message, where the message includes type information and a segment identifier, and the type information is used to indicate that the segment identifier is a binding segment identifier BSID; and a sending unit, configured to send the message to a network device, where the message is used to indicate the network device to perform a processing action on the BSID based on the type information.

Optionally, the message may be a border gateway protocol BGP message, a path computation element communication protocol PCEP message, or the like.

In a possible implementation, that the message includes type information is specifically that a type Type field in the message includes the type information.

In a possible implementation, that the message includes type information is specifically that a flags Flags field in the message includes the type information.

In a possible implementation, the type information occupies at least one bit in the Flags field.

According to a fifth aspect, this application provides a network device. The device includes a processor, a communication interface, and a memory, where the memory is configured to store a computer program and/or data, and the processor is configured to execute the computer program stored in the memory to implement the following operations:

receiving, through the communication interface, a message sent by a controller, where the message includes type information and a segment identifier, and the type information is used to indicate that the segment identifier is a binding segment identifier BSID; and performing a processing action on the BSID based on the type information. Optionally, the message may be a border gateway protocol BGP message, a path computation element communication protocol PCEP message, or the like.

In a possible implementation, that the message includes type information is specifically that a type Type field in the message includes the type information.

In a possible implementation, that the message includes type information is specifically that a flags Flags field in the message includes the type information.

In a possible implementation, the type information occupies at least one bit in the Flags field.

In a possible implementation, the performing a processing action on the BSID based on the type information specifically includes:

checking, based on the type information, whether a route to a device indicated by the BSID exists, and skipping checking whether the BSID exists in a topology to which the network device belongs; or skipping, based on the type information, performing failure check on the BSID.

In a possible implementation, the message further includes a segment identifier SID, and the SID is a segment identifier of a type different from a type of the BSID; and the processor is further configured to implement the following operations:

checking, based on the type of the SID, whether a route to a device indicated by the SID exists, and checking whether the SID exists in the topology to which the network device belongs.

According to a sixth aspect, this application provides a controller, including a processor, a communication interface, and a memory, where the memory is configured to store a computer program and/or data, and the processor is configured to execute the computer program stored in the memory to implement the following operations:

generating a message, where the message includes type information and a segment identifier, and the type information is used to indicate that the segment identifier is a binding segment identifier BSID; and sending the message to a network device through the communication interface, where the message is used to indicate the network device to perform a processing action on the BSID based on the type information. Optionally, the message may be a border gateway protocol BGP message, a path computation element communication protocol PCEP message, or the like.

In a possible implementation, that the message includes type information is specifically that a type Type field in the message includes the type information.

In a possible implementation, that the message includes type information is specifically that a flags Flags field in the message includes the type information.

In a possible implementation, the type information occupies at least one bit in the Flags field.

According to a seventh aspect, this application provides a computer-readable storage medium. The computer-readable storage medium stores a computer program, and the computer program is executed by a processor to implement the method according to any item of the first aspect, or the computer program is executed by a processor to implement the method according to any item of the second aspect.

According to an eighth aspect, this application provides a computer program product. When the computer program product is read and executed by a computer, the method according to any item of the first aspect is performed, or when the computer program product is read and executed by a computer, the method according to any item of the second aspect is performed.

According to a ninth aspect, this application provides a computer program. When the computer program is executed on a computer, the computer is enabled to implement the method according to any item of the first aspect, or when the computer program is executed on a computer, the computer is enabled to implement the method according to any item of the second aspect.

According to a tenth aspect, this application provides a binding segment identifier processing system. The system includes a network device and a controller, where the network device is the network device according to any item of the third aspect and the controller is the controller according to any item of the fourth aspect, or the network device is the network device according to any item of the fifth aspect and the controller is the controller according to any item of the sixth aspect.

In conclusion, in this application, the type of the BSID is specified in the delivered message, so that the network device can identify the BSID in the segment routing policy, and can further process the BSID based on the processing action corresponding to the type, thereby avoiding an incorrect processing result caused by incorrect or improper processing performed because the BSID cannot be identified.

DETAILED DESCRIPTION OF ILLUSTRATIVE EMBODIMENTS

The following describes embodiments of this application with reference to the accompanying drawings.

Figure 1:
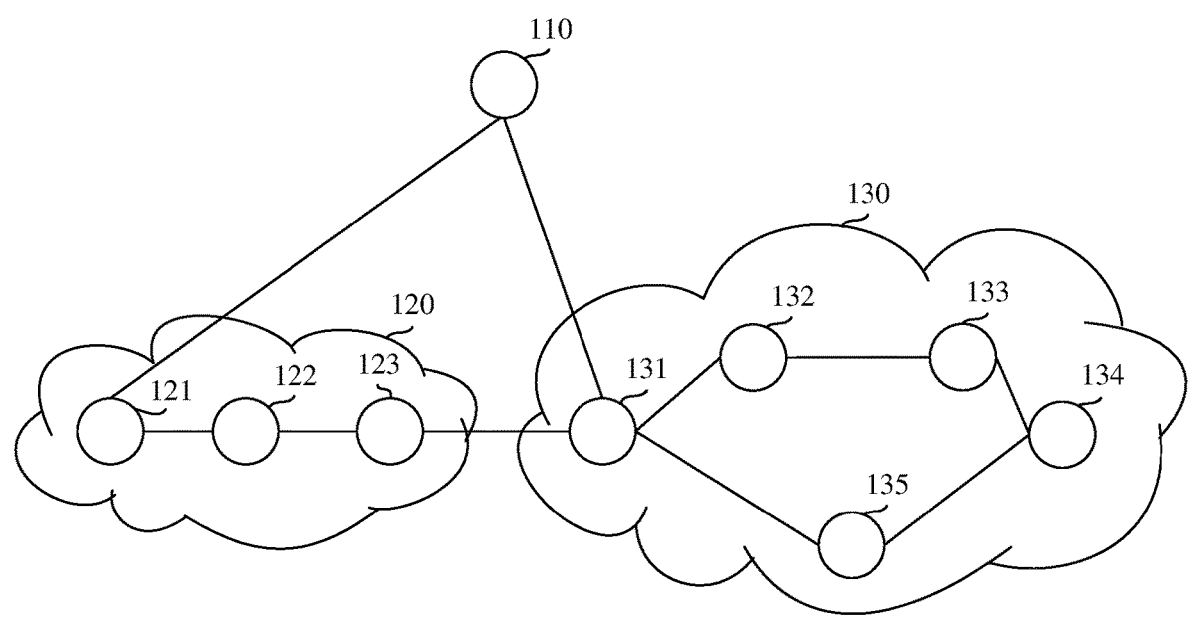
FIG. 1 is a schematic diagram of a scenario according to an embodiment of this application.

FIG. 1 shows a possible application scenario of a binding segment identifier processing method according to an embodiment of this application. The scenario is a cross-autonomous system (AS) data forwarding scenario.

The scenario shown in FIG. 1 may be a segment routing (SR) network, and the SR network may include a controller 110, an autonomous system 120, and an autonomous system 130. The autonomous system 120 includes a plurality of network devices, for example, a network device 121, a network device 122, and a network device 123. The autonomous system 130 also includes a plurality of network devices, for example, includes a network device 131, a network device 132, a network device 133, a network device 134, and a network device 135. The network device 123 in the autonomous system 120 and the network device 131 in the autonomous system 130 are boundary devices, for example, each may be an autonomous system boundary router (ASBR).

The controller 110 may implement mutual communication with the network device according to a border gateway protocol (BGP) or a path computation element protocol (PCEP). Then, the controller no may calculate a data forwarding path for the network device in the autonomous system by using a path computation element (PCE), and send the calculated path to the network device.

The network device in the autonomous system may forward a message through the forwarding path provided by the controller no. Optionally, the network device may be a switch, a router, or the like. These network devices may also be referred to as path computation clients (PCC).

FIG. 1 shows an example in which a communication connection is established between the controller no and the network device 121 in the autonomous system 120, and a communication connection is established between the controller no and the network device 131 in the autonomous system 130. It is assumed that the network device 121 is a head node for data forwarding. Then, the controller 110 sends a data forwarding path to the network device 121.

It should be noted that the data forwarding path sent by the controller no may be represented by a segment identifier list (Segment ID List, SID list). The segment identifier list may include a plurality of segment identifiers SIDs. These SIDs may include identifiers of various segment types, for example, a SID type based on multiprotocol label switching (MPLS), a SID type based on an Internet protocol version 4 (IPv4), or a SID type based on an Internet protocol version 6 (IPv6).

As shown in FIG. 1, in the cross-AS scenario, to smoothly forward a message to the autonomous system 130, the segment identifier list sent by the controller to the network device 121 includes a binding segment identifier BSID. The BSID is bound to the segment identifier list of the forwarding path in the autonomous system 130. After the network device 123 forwards data to the network device 131, the network device 131 may find the bound segment identifier list based on the binding segment identifier BSID, so that the network device 131 can continue to forward the data. The binding segment identifier may also be referred to as a stitching label.

The possible application scenario of the binding segment identifier processing method provided in this embodiment of this application may further include a scenario in which a forwarding path is excessively long in a same AS. In this case, the forwarding path may be divided into several parts, and one BSID between two adjacent parts is used to connect the two path parts. For example, it is assumed that the forwarding path is divided into a first part and a second part. Then, there is a BSID between the two forwarding path parts. The BSID may be bound to the second forwarding path part. When data is forwarded to a first network device of the second path part, the network device may find the second forwarding path part based on the BSID, and then continue to forward a message.

An application scenario of the binding segment identifier processing method provided in this embodiment of this application is not limited to the foregoing scenarios, and any scenario to which the binding segment identifier processing method provided in this embodiment of this application may be applied falls within the protection scope of this application.

Figure 2:
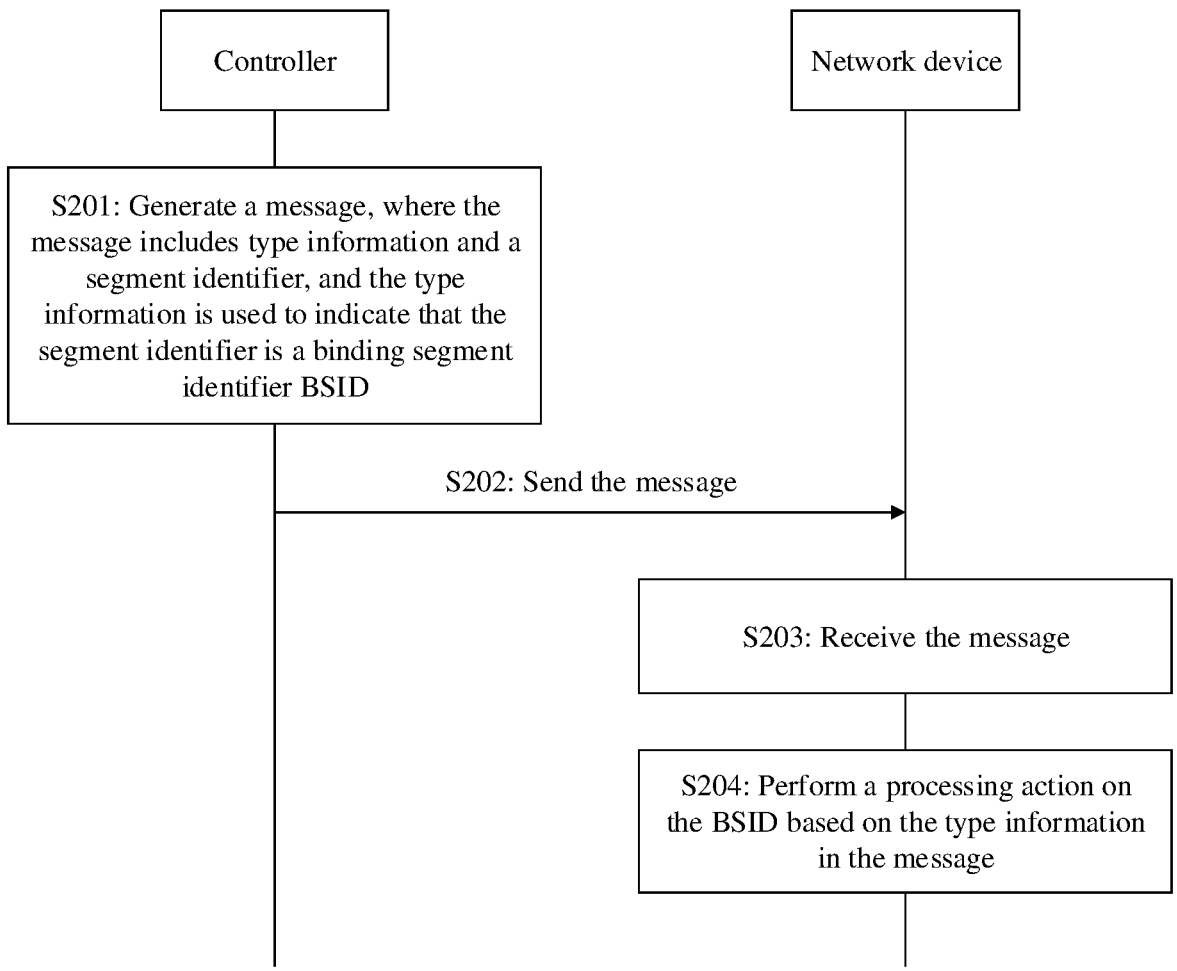
FIG. 2 is a schematic flowchart of a binding segment identifier processing method according to an embodiment of this application.

The following describes a binding segment identifier processing method according to an embodiment of this application. The method may be applied to any of the foregoing scenarios. Refer to FIG. 2. The method may include but is not limited to the following steps:

A controller generates a message, where the message includes type information and a segment identifier, and the type information is used to indicate that the segment identifier is a binding segment identifier BSID.

Optionally, the message generated by the controller may be a border gateway protocol BGP message, a path computation element communication protocol PCEP message, or the like.

Specifically, the BSID is used to bind a segment identifier list corresponding to a forwarding path segment. In this design, a length of a label stack can be reduced, so that in a cross-AS scenario or when a forwarding path is long, a problem that the segment identifier list cannot carry all identifiers because a depth of the segment identifier list exceeds a list depth supported by a network device can be resolved. That is, in the cross-AS scenario or in the scenario in which the forwarding path is long, a data packet can be smoothly forwarded based on the BSID through a planned forwarding path. For example, in the cross-AS scenario, the BSID is used to connect forwarding paths in two ASs, that is, specific content of SIDs in a segment identifier list may be hidden by using the BSID. For another example, in the scenario in which the forwarding path is long, the forwarding path is divided into two segments, and the BSID is used to indicate a segment identifier list corresponding to a specific forwarding path segment.

The planned forwarding path includes the segment identifier list or a segment routing policy (SR Policy). In this case, for the cross-AS scenario (or when the forwarding path is long), it is assumed that the scenario includes a first AS (or a first forwarding path segment) and a second AS (or a second forwarding path segment), a forwarding path in the first AS (or the first forwarding path segment) is a first path, and a forwarding path in the second AS (or the second forwarding path segment) is a second path. Then, one BSID may be configured for the second path. The controller may send the SR policy to a head node in the first AS, where the SR policy includes the BSID, and the BSID may be considered as a SID of a network device in the SR policy. In addition, in the second AS, the BSID corresponds to a specific forwarding path. In this way, after receiving a related data packet, the head node in the first AS adds a segment identifier list to the data packet according to the SR policy. The segment identifier list includes the BSID. When the BSID is forwarded together with data to the second AS (or the second forwarding path segment), the second forwarding path may be found based on the BSID, and then the data is forwarded through the second forwarding path. It should be noted that, when data forwarding is performed, a head node of a data forwarding path encapsulates the BSID into a data packet header and forwards the BSID together with the data. In SRv6, the data packet header may be referred to as a segment routing header (SRH).

In a specific embodiment, the controller may obtain a network topology of a forwarding plane including network devices, and may plan the data forwarding path based on information about the network topology.

In a possible implementation, the controller/PCE calculates a data packet forwarding path based on a path computation request sent by the network device, where the path computation request may include information such as a destination address for data forwarding. After calculating the forwarding path, the controller may send the calculated forwarding path or path selection policy information to the network device in a form of the SR policy or the segment identifier list. Specifically, the controller encapsulates the SR policy or the segment identifier list into a message, and then sends the message to the network device. The message encapsulated by the controller includes a BGP message or a PCEP message.

Alternatively, in another possible implementation, the controller may plan and calculate, based on existing network topology information, forwarding paths from the network device to various destination addresses. Then, these forwarding paths are represented by segment identifier lists, these segment identifier lists are encapsulated into a message, and the message is sent to the network device.

The segment identifier list includes one or more segment identifiers SIDs. The segment identifiers SIDs may include a SID used to identify a network device, a SID used to identify a link between two network devices, and the like. For the cross-AS scenario or the scenario in which the forwarding path is long, the segment identifier list may further include a binding segment identifier BSID.

In another possible implementation, for the cross-AS scenario or the scenario in which the forwarding path is long, when sending the BSID to the network device, the controller may separately generate a message to send the BSID, that is, a segment identifier list in the message includes only the BSID. Alternatively, the BSID may be sent together with another SID in a message. However, a segment identifier list included in the message may not be a complete SR policy, but may be a part of SIDs included in the SR policy or the like.

Specifically, when sending the message including the segment identifier list to the network device, the controller encapsulates the message in a preset format, for example, encapsulates the message in a TLV format. TLV is a structure including a type Tag of data, a length Length of the data, and a value Value of the data, and can be used to describe almost any data type.

The Value of the TLV may also be of a TLV structure. This nested characteristic may be used to implement protocol encapsulation. Therefore, a value value of the SID included in the segment identifier list in the message generated by the controller may be a nested TLV structure (the nested TLV may also be referred to as sub-TLV). It should be noted that values of SIDs of a same type may be encapsulated into one sub-TLV structure, and values of SIDs of different types may be encapsulated into different sub-TLV structures.

For example, assuming that the segment identifier list includes two different types of SIDs, the message that encapsulates the segment identifier list is of a TLV structure as a whole. Each of values of the two SIDs may be encapsulated into one sub-TLV structure. In this case, the message of the TLV structure is nested with two sub-TLV structures.

For another example, it is assumed that the segment identifier list includes two SIDs of a same type and one BSID that is different from the two SIDs in type. Then, the message that encapsulates the segment identifier list is of a TLV structure as a whole. Values of the two SIDs of the same type may be encapsulated into one sub-TLV structure. The BSID may be separately encapsulated into one sub-TLV. In this case, the message that is of the TLV structure and that includes the three identifiers is nested with two sub-TLV structures.

For ease of understanding of the sub-TLV structure, the following provides examples for description with reference to FIG. 3, FIG. 4, FIG. 5, FIG. 6, and FIG. 7.

Figure 3:
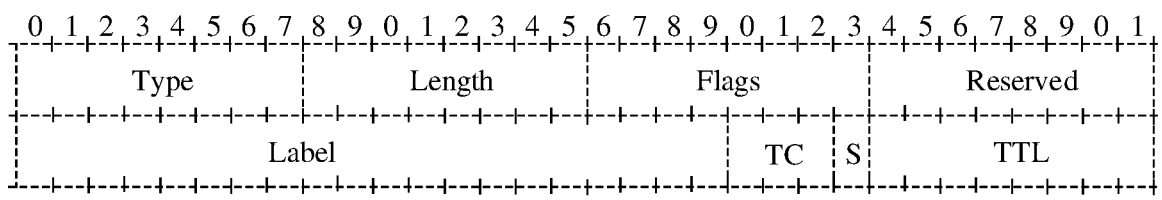
FIG. 3 is a schematic diagram of a structure of encapsulated data in a message.

FIG. 3 shows a sub-TLV structure that encapsulates a SID of an MPLS label format. The MPLS-based SID may be. It can be learned that the sub-TLV structure includes the following several parts:

Type Type: Type herein refers to a segment type of a SID. 11 segment types are defined in a draft segment routing policy published by the Internet engineering task force (IETF). The ii segment types are respectively represented by 1, 2, 3, 4, 5, 6, 7, 9, 10, 11, and 12, that is, each of the 11 values represents a segment type. Alternatively, the 11 segment types are respectively represented by A, B, C, D, E, F, G, H, I, J, and K, that is, each of the 11 letters represents a segment type. The segment types 1, 2, 3, 4, 5, 6, 7, 9, 10, 11, and 12 are successively in a one-to-one correspondence with the segment types A, B, C, D, E, F, G, H, I, J, and K, that is, the type A is the type 1, the type B is the type 2, and the like. A segment type of the SID of the MPLS label format is A. Then, when the SID of the MPLS label format is encapsulated, a value of the Type field of the sub-TLV shown in FIG. 3 is 1.

Length Length: The Length refers to a quantity of bytes occupied by a value of a label Label in the sub-TLV, and may be six bytes.

Flags Flags: The Flags is used to define some necessary operations, restrictions, or the like.

Reserved RESERVED: The RESERVED is a reserved field, and is set to o during sending and may be ignored during receiving.

Label Label: A value of the Label field is a specific value of an MPLS label, and the field may occupy 20 bits.

Traffic control (TC): The TC may be used to define a traffic type, and may occupy three bits.

Bottom of stack identifier S: The bottom of stack identifier occupies one bit.

Time-to-live (TTL): The TTL is used to define a quantity of network devices through which the sub-TLV can be forwarded, and may occupy one byte.

Figure 4:
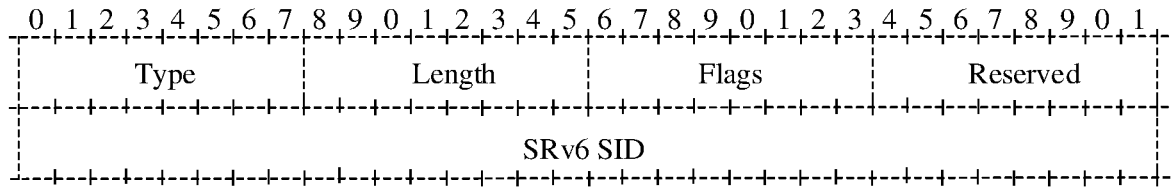
FIG. 4 is a schematic diagram of a structure of encapsulated data in another message.

FIG. 4 shows a sub-TLV structure that encapsulates a SID of an IPv6 address format. It can be learned that the sub-TLV structure includes the following several parts:

Type Type: Similarly, the Type herein refers to a segment type of a SID, and a segment type of the SID of the IPv6 address format is B. Then, when the SID of the IPv6 address format is encapsulated, a value of the Type field of the sub-TLV shown in FIG. 4 is 2.

Length Length: The Length herein refers to a quantity of bytes occupied by a value of the SID of the IPv6 address format in the sub-TLV, and may be 18 bytes.

Flags Flags: The Flags is used to define some necessary operations, restrictions, or the like.

Reserved RESERVED: The RESERVED is a reserved field, and is set to o during sending and may be ignored during receiving.

Segment routing identifier in an IPv6-based SR network SRv6 SID: A value of the SRv6 SID field is a specific value of the IPv6-based SID, and the field may occupy 16 bytes.

Figure 5:
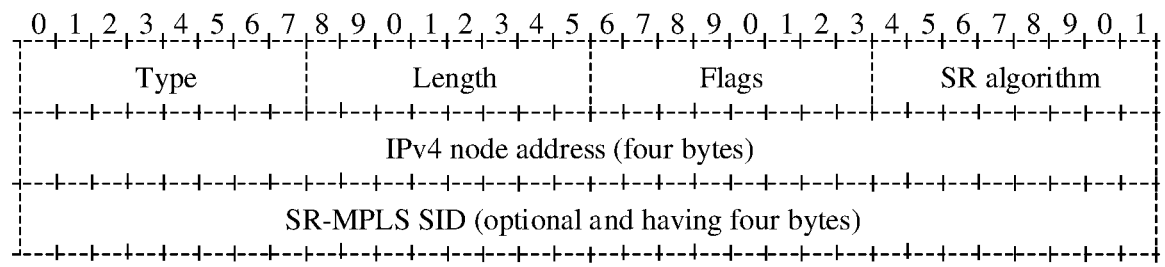
FIG. 5 is a schematic diagram of a structure of encapsulated data in another message.

FIG. 5 shows a sub-TLV structure that encapsulates a SID of an IPv4 address format+an optional SID of an MPLS label format. It can be learned that the sub-TLV structure includes the following several parts:

Type Type: Similarly, the Type herein refers to a segment type of a SID, and for the SID of the IPv4 address format+ the optional SID of the MPLS label format, a segment type is C. Then, when the SID of the IPv4 address format+the optional SID of the MPLS label format are encapsulated, a value of the Type field of the sub-TLV shown in FIG. 5 is 3.

Length Length: The Length refers to a quantity of bytes occupied by a value of the SID in the sub-TLV, and may be six bytes or 10 bytes.

Flags Flags: The Flags is used to define some necessary operations, restrictions, or the like.

Segment routing algorithm SR Algorithm: The SR Algorithm is used to indicate an algorithm associated with the SID.

IPv4-based node address IPv4 Node Address: The IPv4 Node Address is used to identify a node (namely, a network device).

SR-MPLS SID: The SR-MPLS SID is an optional field with a length of four bytes, and a format of the SID is the same as a label format of the segment type A.

Figure 6:
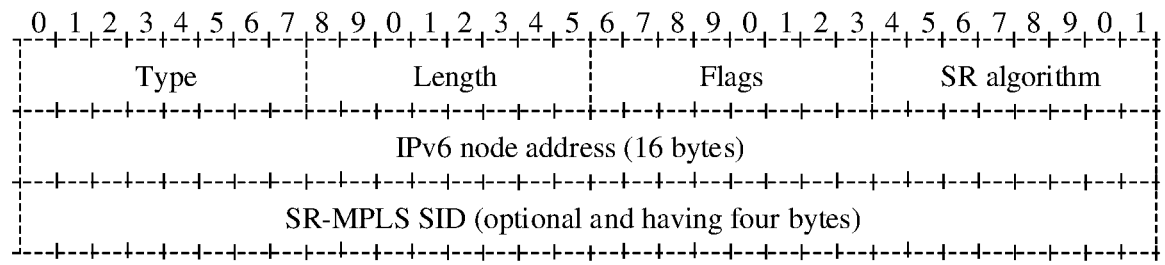
FIG. 6 is a schematic diagram of a structure of encapsulated data in another message.

FIG. 6 shows a sub-TLV structure that encapsulates a SID of an IPv6 address format+an optional SID of an MPLS label format. It can be learned that the sub-TLV structure includes the following several parts:

Type Type: Similarly, the Type herein refers to a segment type of a SID, and for the SID of the IPv6 address format+ the optional SID of the MPLS label format, a segment type is D. Then, when the SID of the IPv6 address format+the optional SID of the MPLS label format are encapsulated, a value of the Type field of the sub-TLV shown in FIG. 6 is 4.

Length Length: The Length herein refers to a quantity of bytes occupied by a value of the SID in the sub-TLV, and may be 18 bytes or 22 bytes.

Flags Flags: The Flags is used to define some necessary operations, restrictions, or the like.

Segment routing algorithm SR Algorithm: The SR Algorithm is used to indicate an algorithm associated with the SID.

IPv6-based node address IPv4 Node Address: The IPv6 Node Address is used to identify a node (namely, a network device).

SR-MPLS SID: The SR-MPLS SID is an optional field with a length of four bytes, and a format of the SID is the same as a label format of the segment type A.

Figure 7:
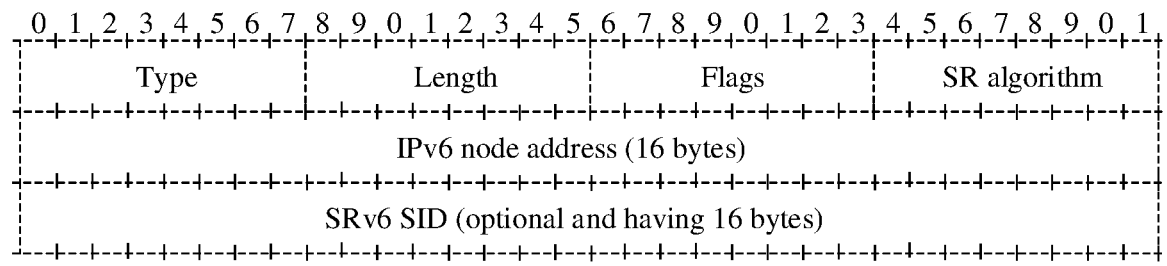
FIG. 7 is a schematic diagram of a structure of encapsulated data in another message.

FIG. 7 shows a sub-TLV structure that encapsulates a SID of an IPv6 address format+an optional SRv6 SID. It can be learned that the sub-TLV structure includes the following several parts:

Type Type: Similarly, the Type herein refers to a segment type of a SID, and for the SID of the IPv6 address format+ the optional SRv6 SID, a segment type is I. Then, when the SID of the IPv6 address format+the optional SRv6 SID are encapsulated, a value of the Type field of the sub-TLV shown in FIG. 7 is 10.

Length Length: The Length herein refers to a quantity of bytes occupied by a value of the SID in the sub-TLV, and may be 18 bytes or 34 bytes.

Flags Flags: The Flags is used to define some necessary operations, restrictions, or the like.

Segment routing algorithm SR Algorithm: The SR Algorithm is used to indicate an algorithm associated with the SID.

IPv6-based node address IPv4 Node Address: The IPv6 Node Address is used to identify a node (namely, a network device).

SRv6 SID: The SRv6 SID is an optional field, is in the IPv6 address format, may be used to identify a node or link, and has a length of 16 bytes.

It should be noted that the foregoing structures are mainly examples of the BGP message, the sub-TLV structure that encapsulates the SID in the message is not limited to the foregoing described structures, and another sub-TLV structure may further exist. For example, the sub-TLV structure may alternatively be a sub-TLV structure that is generated according to a PCEP and that is used to encapsulate the SID. For details, refer to FIG. 8 and FIG. 9.

Figure 8:
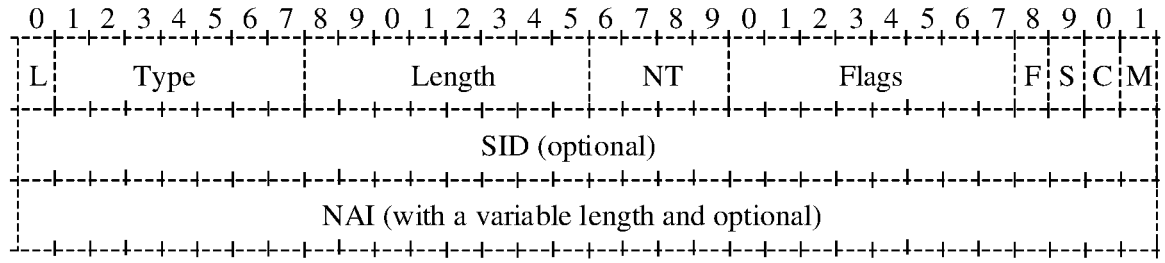
FIG. 8 is a schematic diagram of a structure of encapsulated data in another message.

FIG. 8 shows a structure of a segment routing explicit route object (explicit route object, ERO) or a segment routing route record object (SR-RRO) defined in the PCEP. The segment routing explicit route object may be referred to as an SR-ERO sub-object, and the segment routing route record object may be referred to as an SR-RRO sub-object. The SR-ERO sub-object and the SR-RRO sub-object may be used to carry path information of subsection routing traffic engineering (SR-TE) or the SR policy. It can be seen from FIG. 8 that the structure of the SR-ERO sub-object or the SR-RRO sub-object is actually a sub-TLV structure. For a meaning of each field of the sub-TLV structure, refer to Table 1.

TABLE 1

| Field name | Length | Meaning |
| --- | --- | --- |
| L | One bit | Loose path flag |
| Type | Seven bits | Type |
| Length | Eight bits | Length |
| NT | Four bits | Type flag of an SR SID, where NT (NAI Type) represents a type of a node or adjacency identifier (NAI) NT = 0 The NAI is absent; NT = 1 IPv4 node ID; NT = 2 IPv6 node ID; NT = 3 IPv4 adjacency NT = 4 IPv6 adjacency with a global IPv6 address NT = 5 Unnumbered adjacency with an IPv4 node D NT = 6 IPv6 adjacency with a link-local IPv6 address |
| Flags | 12 bits | Flag bits Flag F: When this bit is 1, it is identified that the TLV does not include the NAI Flag S: When this bit is 1, it is identified that the TLV does not include the SR SID Flag C: When a bit M and this bit are set to 1 at the same time, it is identified that TC, S, and TTL fields are specified by the PCE Flag M: When this bit is 1, it is identified that a SID is MPLS Label |
| SID | 32 bits | MPLS Label represents SR Segment |
| NAI | Lengthened | NAI corresponding to the SR SID |

Figure 9:
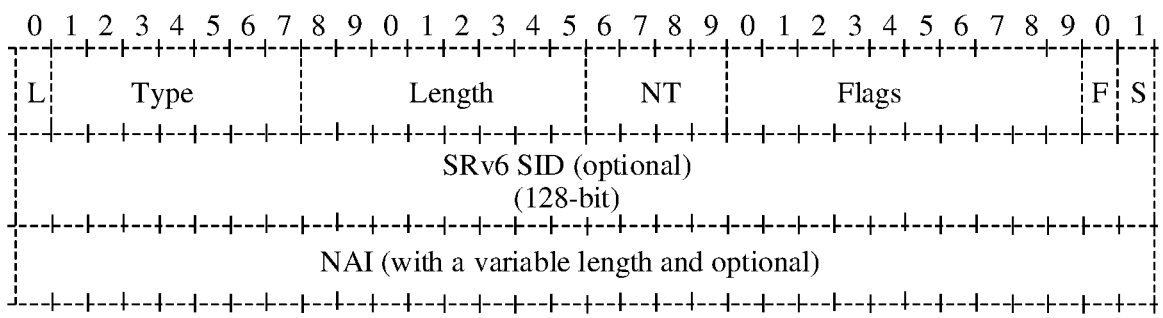
FIG. 9 is a schematic diagram of a structure of encapsulated data in another message.

FIG. 9 shows an SRv6-ERO sub-object or an SRv6-RRO sub-object defined in the PCEP, which is used to carry path information of SRv6. It can be seen from FIG. 9 that a structure of the SRv6-ERO sub-object or the SRv6-RRO sub-object is actually a sub-TLV structure. For a meaning of each field of the sub-TLV structure, refer to Table 2.

TABLE 2

| Field name | Length | Meaning |
| --- | --- | --- |
| L | One bit | Loose path flag |
| Type | Seven bits | Type, which is not defined by the Internet assigned numbers authority (IANA) |
| Length | Eight bits | Length |
| NT | Four bits | Type flag of an SRv6 SID, where NT represents a type of a NAI |
| Flags | 12 bits | Flag bits Flag F: When this bit is 1, it is identified that the TLV includes the NAI Flag S: When this bit is 1, it is identified that the TLV includes the SRv6 SID |
| Function code | 16 bits | Used to identify Function of the SRv6 SID |

TABLE 2-continued

| Field name | Length | Meaning |
| --- | --- | --- |
| SRv6 SID | 128 bits | A 128-bit IPv6 address represents SRv6 Segment |
| NAI | Lengthened | NAI corresponding to the SRv6 SID |

In a specific embodiment, the sub-TLV structure that encapsulates the SID in the message is not limited to the foregoing described structures. A specifically used sub-TLV structure is determined based on an actual requirement, and is not limited in this solution.

It can be learned from the foregoing descriptions that the message sent by the controller to the network device carries the segment type of the SID, and the network device may identify the SID by using the segment type, so that different processing is performed on SIDs of different segment types. However, when the message includes the BSID, a segment type of the BSID is not defined in the conventional technology. Consequently, the network device cannot identify the BSID in some cases. In this case, the network device performs incorrect processing on the BSID.

For example, to avoid failed data forwarding due to a failure of the forwarding path indicated by the segment identifier list, the network device may perform failure check by using an identifier in the received segment identifier list. If the segment identifier list includes the BSID, a specific type of the BSID is not defined and the BSID is not flooded in an SR network topology, that is, the BSID does not exist in another network device in the SR network topology. Then, when failure check is performed, the network device mistakenly considers that the BSID is invalid. Consequently, a failure is misreported.

To resolve the foregoing problem, in this embodiment of this application, when the controller sends the message to the network device, if the segment identifier list of the message includes the BSID, the type of the BSID is specifically indicated in the message, that is, the message includes specific type information and a specific segment identifier, where the specific type information is used to indicate that the specific segment identifier is a binding segment identifier BSID. Specifically, the segment identifier may be implemented by using a nested sub-TLV structure.

In a possible implementation, the sub-TLV structure that encapsulates the BSID may be the structure shown in FIG. 3, FIG. 4, FIG. 5, FIG. 6, or FIG. 7. In this example, the structures shown in FIG. 3, FIG. 4, FIG. 5, FIG. 6, and FIG. 7 are mainly examples of the BGP message. The sub-TLV that encapsulates the BSID may alternatively be a sub-TLV structure that is generated according to the PCEP and that is used to encapsulate the BSID, for example, the structure shown in FIG. 8 or FIG. 9. However, the value of the Type field of the sub-TLV structure is a value indicating the type of the BSID.

For example, for the structure shown in FIG. 3, FIG. 4, FIG. 5, FIG. 6, or FIG. 7, the value of the type of the BSID may be a value of a type other than the ii segment types defined in the draft segment routing policy published by the IETF, for example, may be 13, 14, or 15. Then, segment types corresponding to 13, 14, and 15 may be respectively a segment type L, a segment type M, and a segment type N.

For another example, for the structures shown in FIG. 8 and FIG. 9, the value of the type of the BSID may be a value of any type other than an existing defined segment type in the PCEP.

The type of the BSID and the value corresponding to the type are merely provided herein as examples. However, the type of the BSID and the value corresponding to the type are not limited to those listed, and may alternatively be another type and another type value. It should be noted that the network device in the SR network may identify the value of the type of the BSID, and may process a corresponding BSID based on the type and a preset rule.

In another possible implementation, the sub-TLV structure that encapsulates the BSID may be the structure shown in FIG. 3, FIG. 4, FIG. 5, FIG. 6, or FIG. 7. In this example, the structures shown in FIG. 3, FIG. 4, FIG. 5, FIG. 6, and FIG. 7 are mainly examples of the BGP message. The sub-TLV that encapsulates the BSID may alternatively be a sub-TLV structure that is generated according to the PCEP and that is used to encapsulate the BSID, for example, the structure shown in FIG. 8 or FIG. 9. However, in this embodiment, the type of the BSID is not indicated by the Type field of the sub-TLV structure, but the type of the BSID is defined by occupying a preset quantity of bits in the flags Flags field of the sub-TLV structure.

Figure 10:
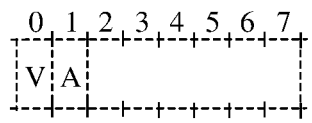
FIG. 10 is a schematic diagram of a structure of a flags field in a message.
Figure 11:
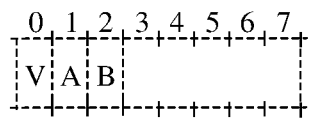
FIG. 11 is a schematic diagram of a structure of another flags field in a message according to an embodiment of this application.

For the structure shown in FIG. 3, FIG. 4, FIG. 5, FIG. 6, or FIG. 7, for a specific description of defining the type of the BSID by occupying the preset quantity of bits in the flags Flags field of the sub-TLV structure, refer to FIG. 10 and FIG. 11.

FIG. 10 shows a structure of the Flags field of the sub-TLV structure of the structure shown in FIG. 3, FIG. 4, FIG. 5, FIG. 6, or FIG. 7 in the conventional technology. It can be learned that the Flags field occupies one byte and eight bits. In FIG. 10, only two bits of the Flags field are occupied to define two flags. A flag V that occupies a first bit is used to flag whether local check is performed on an identifier in the sub-TLV structure. For example, if the bit is set to 1, local check is performed; or if the bit is set to 0, local check is not performed. A flag A that occupies a second bit is used to flag an algorithm. Some SIDs carry algorithms, and the bit may be used to flag the algorithms associated with the SIDs.

FIG. 11 shows an example of a structure of the Flags field of the sub-TLV structure according to an embodiment of this application. Based on FIG. 10, in FIG. 11, a third bit is occupied to flag the type of the BSID, and the flag bit may be represented by a character B. Optionally, the flag bit used to flag the type of the BSID is not limited to one bit, and may alternatively be a flag bit that occupies more than one bit. In addition, the flag character of the type of the BSID is not limited to being represented by the character B, and may alternatively be represented by another character, for example, BS or BSID. When the flag bit of the type of the BSID is set to 1, it indicates that the value value of the sub-TLV structure is BSID. It should be noted that the network device in the SR network may identify the value of the type of the BSID, and may process a corresponding BSID based on the type and a preset rule.

For the structure shown in FIG. 8 or FIG. 9, it can be seen from FIG. 8 that the existing Flags field includes a flag F, a flag S, a flag C, and a flag M. It can be seen from FIG. 9 that the existing Flags field includes a flag F and a flag S. Therefore, in this embodiment of this application, one or more bits that are not defined in the Flags field in the structure shown in FIG. 8 or FIG. 9 may be occupied to flag the type of the BSID, and the flag bit may be represented by a character B. The flag character of the type of the BSID is not limited to being represented by the character B, and may alternatively be represented by another character, for example, BS or BSID. When the flag bit of the type of the BSID is set to 1, it indicates that the value value of the sub-TLV structure is BSID. It should be noted that the network device in the SR network may identify the value of the type of the BSID, and may process a corresponding BSID based on the type and a preset rule.

Optionally, the type of the BSID may alternatively be defined in another field of the sub-TLV structure that encapsulates the BSID, for example, the RESERVED field or the NT field, or the type of the BSID may be defined in a specific field in the message.

In addition, the sub-TLV structure that encapsulates the BSID is not limited to the structures shown in FIG. 3, FIG. 4, FIG. 5, FIG. 6, FIG. 7, FIG. 8, and FIG. 9, another sub-TLV structure further exists, and the type of the BSID may alternatively be indicated in the another sub-TLV structure. This is not limited in this solution.

It should be noted that, the foregoing definition of the type of the binding segment identifier BSID and related processing of the BSID may be formulated as a standard according to a related protocol (for example, the draft segment routing policy protocol published by the IETF or the PCEP). Then, a device in the SR network may identify the BSID according to the protocol, and may process the BSID according to the protocol.

Figure 12:
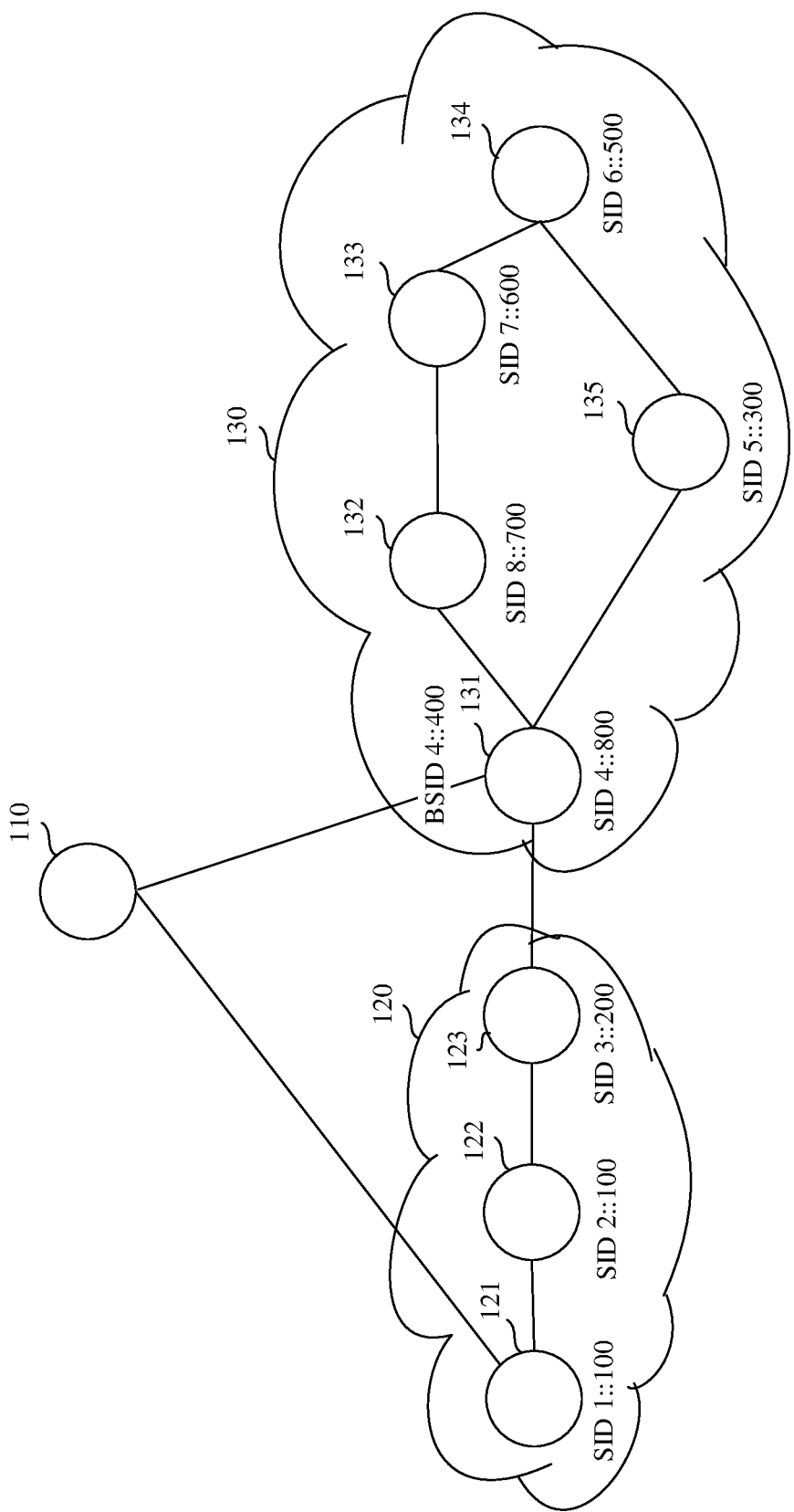
FIG. 12 is a schematic diagram of a structure of an SR network according to an embodiment of this application.

For ease of understanding of the segment identifier list, the following uses FIG. 12 as an example for description.

FIG. 12 may show a cross-autonomous system SR network. The network shown in FIG. 12 is the same as the network shown in FIG. 1. The foregoing descriptions of FIG. 1 are applicable to FIG. 12. In the SR network, it is assumed that the network device 121 is a head node for data forwarding, and the network device 134 is a destination node for data forwarding. A data forwarding path obtained by the controller no through calculation based on the head node and the destination node is: the network device 121-the network device 122-the network device 123-the network device 131-the network device 135-the network device 134.

In addition, FIG. 12 shows an example of an IPv6-based SR network (SRv6). Therefore, it can be further seen from FIG. 12 that each network device is configured with an SRv6-based SID. These SIDs may be addresses corresponding to the network devices, and each have a positioning function. Usually, each SID may uniquely identify a network device in the SR network. The SID of each network device may be configured by the controller and sent to a corresponding network device, and then the network device diffuses the SID of the network device to another network device in a flooding manner. After receiving the flooded SID, the another network device stores the SID for subsequent processing, for example, for draining during data forwarding.

It should be noted that the network device continuously floods the SID of the network device in the SR network, and the another network device in the SR network updates the received SID once after each time of flooding. However, when a specific network device is unreachable, for example, fails, another network device does not receive a SID flooded by the network device, and the another network device does not store the SID of the network device after updating the received SID.

After obtaining the data forwarding path through calculation, the controller no may represent the forwarding path by using SIDs of network devices in the forwarding path, and the SIDs of the network devices in the forwarding path form a segment identifier list. FIG. 12 shows the cross-autonomous system SR network. Therefore, the forwarding path may be divided into two segments. A first segment is a forwarding path in the autonomous system 120, that is, the network device 121-the network device 122-the network device 123, and a second segment is a forwarding path in the autonomous system 130, that is, the network device 131-the network device 135-the network device 134. To connect the two forwarding path segments, the second forwarding path segment may be bound by using a binding segment identifier BSID, and in the first forwarding path segment, the BSID may be used as an SID of a network device.

Based on the foregoing descriptions and with reference to the SIDs of the network devices shown in FIG. 12, a segment identifier list of the first forwarding path segment may be {2::100, 3::200, 4::400}, and a segment identifier list of the second forwarding path segment is {4::800, 5::300, 6::500}. Then, the controller 110 encapsulates the segment identifier list {2::100, 3::200, 4::400} into a message, and sends the message to a head node of the first forwarding path segment, namely, the network device 121. The controller no encapsulates the segment identifier list {4::800, 5::300, 6::500} into a message, and sends the message to a head node of the second forwarding path segment, namely, the network device 131. Certainly, the two messages include type information of the SIDs and the BSID. For a specific encapsulation structure of the message, refer to the foregoing descriptions. Details are not described herein again.

S202: The controller sends the message to the network device.

Based on the foregoing descriptions, after generating the message that includes the BSID and type information of the BSID, the controller sends the message to a corresponding network device.

The controller may send the message to the network device according to a PCEP or a BGP.

S203: The network device receives the message.

S204: The network device performs a processing action on the BSID based on the type information in the message.

That the network device performs a processing action on the BSID based on the type information in the message may be understood as follows: After it indicates, based on the type information, that the segment identifier is a BSID, the network device may perform a corresponding processing action.

Optionally, the processing action is an action mapped from a type of the BSID.

Optionally, the processing action may alternatively be an action performed by default when it is determined that a specific segment identifier is a binding segment identifier. The action performed by default may be an action determined for the network device upon delivery, or may be an action configured for the network device in advance by the controller, a network management device, or a management staff through a management interface.

Based on the foregoing descriptions, the network device receives the message sent by the controller. The network device may be a head node of a specific forwarding path segment, for example, may be the network device 121 in FIG. 12. Then, the network device parses the message to obtain the segment identifier list in the message and the type information of the SIDs and the BSID in the segment identifier list. The network device may identify specific types of the SIDs and the BSID based on these pieces of type information. Because different types of identifiers are associated with and mapped to corresponding processing actions, after identifying the different types of identifiers, the network device correspondingly processes each type of identifier based on the processing action mapped from the type of the identifier.

For example, if type information of a specific SID is 1, it indicates that the SID is an MPLS-based label; if type information of a specific SID is 2, it indicates that the SID is an IPv6-based address; and if type information of a specific SID is 12, it indicates that the SID is a binding segment identifier BSID. Only an example is described herein. Specific type information of the SIDs in the message and content corresponding to the type information are determined based on a specific situation. This is not limited in this solution.

In the following, to avoid failed data forwarding due to a failure of the forwarding path indicated by the segment identifier list, a scenario in which the network device performs failure check by using a segment identifier is used as an example. After the network device identifies the types of the SIDs and the BSID in the message, a process of correspondingly processing the SIDs and the BSID based on the processing actions mapped from the types of the SIDs and the BSID is described with an example.

The network device may perform failure check by using the segment identifier in the received segment identifier list. The failure check may be divided into two parts:

Topology check: Whether the segment identifier exists in a network topology to which the network device belongs is checked.

Route check: Whether a route from the network device to a device indicated by the segment identifier exists is checked.

In this embodiment of this application, because the BSID is not flooded in the network, the BSID does not exist in the network topology. However, this does not affect normal data forwarding in the network. Therefore, when failure check is performed, if whether the BSID exists in the topology is checked, an alarm is misreported because it is obtained that the BSID does not exist in the topology. Therefore, to avoid misreporting a failure, a processing action associated with and mapped from a BSID type is as follows: Only route check is performed on an identifier of the BSID type, and topology check is not performed. Alternatively, a processing action associated with and mapped from a BSID type is as follows: Failure check is not performed on an identifier of the BSID type. A processing action associated with and mapped from a non-BSID type is as follows: Route check and topology check are performed on an identifier of the non-BSID type.

That the BSID does not exist in the network topology includes: The network topology obtained by the network device according to the BGP or an interior gateway protocol (IGP) does not include the BSID. The network topology includes three layers of network topology.

In this case, after identifying the BSID and another type of SID that are included in the segment identifier list, the network device performs only route check on the BSID without performing topology check, or does not perform failure check on the BSID. However, topology check and route check are performed on the another type of SID. In this example, the type of the BSID is identified, and topology check or failure check is not performed on this type of BSID, thereby avoiding misreporting an alarm, and quickly implementing data forwarding.

For ease of understanding, FIG. 12 is still used as an example for description. It can be learned from the foregoing descriptions that the network device 121 receives the message that includes the segment identifier list {2::100, 3::200, 4::400} and that is sent by the controller no. The network device 121 identifies, based on the type information of the identifiers in the message, that the identifiers 2::100 and 3::200 in the segment identifier list are identifiers of an IPv6-based address type, and 4::400 is a binding segment identifier BSID. Therefore, the network device 121 checks whether the identifiers 2::100 and 3::200 exist in the network topology to which the network device 121 belongs, and checks whether routes from the network device 121 to the network device 122 indicated by the identifier 2::100 and to the network device 123 indicated by the identifier 3::200 exist. However, because 4:400 is a binding segment identifier BSID, the network device 121 checks only whether a route to a network device indicated by 4::400 exists, and does not check whether 4::400 exists in the network topology to which the network device 121 belongs.

Because the identifiers 2::100 and 3::200 are flooded in real time in the network topology, when no failure occurs, both the identifiers 2::100 and 3::200 are stored in the network devices in the network topology. Therefore, when topology check is performed, the network device 121 only needs to search, for the identifiers 2::100 and 3::200, a location that is in a memory of the network device 121 and that stores these flooded identifiers. If there are the identifiers 2::100 and 3::200, it indicates that the identifiers 2::100 and 3::200 exist in the network topology. In this way, it can be determined that the forwarding path corresponding to the segment identifier list {2::100, 3::200, 4::400} does not fail. If the network device 121 does not find a specific identifier, for example, does not find 3::200, it indicates that the forwarding path corresponding to the segment identifier list {2::100, 3::200, 4::400} fails. Then, the network device 121 notifies a service for failover, and the forwarding path may be switched to a standby forwarding path for data forwarding.

For route check, a prefix of an identifier (a prefix of the identifier 2::100 is 2::, a prefix of the identifier 3::200 3::, and a prefix of the identifier 4::400 is 4::) may be checked. In this embodiment of this application, a prefix obtained through conversion based on a 64-bit length of a subnet mask is used as an example for description. It can be seen from FIG. 12 that a prefix of an identifier SID of each network device is different, and prefixes of these identifiers each may uniquely identify a network device in the SR network.

In addition, a prefix of any identifier derived or published by the network device is a prefix of an address identifier of the network device. For example, the BSID 4::400 is used to bind the segment identifier list of the second forwarding path segment in the head node network device 131 of the second forwarding path segment (namely, the forwarding path in the autonomous system 130), that is, a segment identifier list corresponding to the BSID 4::400 may be {8::700, 7::600, 6::500}. For the first forwarding path segment, the BSID 4::400 is an address identifier of the network device 131. Therefore, the BSID 4::400 may be considered as an identifier derived by the network device 131. Therefore, the prefix of the BSID 4::400 is a prefix of the address identifier 4::800 of the network device 131.

The address identifier of the network device 131 is flooded in real time in the network topology. Therefore, when no failure occurs, other network devices in the network topology store the prefix 4:: of the address identifier of the network device 131. Therefore, when route check is performed on 4::400, the network device 121 only needs to search, for the identifier prefix 4::, a location that is in the memory of the network device 121 and that stores these identifiers flooded according to the IGP or the BGP. If there is the identifier prefix 4::, it indicates that the route from the network device 121 to the network device 131 indicated by the BSID 4::400 exists. If there is no identifier prefix 4::, it indicates that the route from the network device 121 to the network device 131 indicated by the BSID 4::400 does not exist. This indicates that the forwarding path corresponding to the segment identifier list {2::100, 3::200, 4:400} fails. In this case, the network device 121 notifies a service for failover, and the forwarding path may be switched to a standby forwarding path for data forwarding, thereby ensuring successful data forwarding. A route check process of 2::100 and 3::200 is the same as a route check process of 4::400. Details are not described herein again.

It should be noted that some processing actions are associated with and mapped from the type of the BSID, so that a process in which the network device performs these processing actions after identifying the type of the BSID is not limited to the foregoing failure check scenario, but can be further applied to another scenario. This is not limited in this solution.

It should be noted that, in the foregoing examples, the IPv6-based SR network is mainly used as an example for description. However, the binding segment identifier processing method provided in this embodiment of this application is also applicable to an MPLS-based SR network.

In conclusion, in this application, the type of the BSID is specified in the delivered message, so that the network device can identify the BSID in the segment routing policy, and can further process the BSID based on the processing action corresponding to the type, thereby avoiding an incorrect processing result caused by incorrect or improper processing performed because the BSID cannot be identified.

The foregoing mainly describes the binding segment identifier processing method provided in embodiments of this application. It may be understood that, to implement the foregoing corresponding functions, each device includes corresponding hardware structures and/or software modules for performing the functions. Persons skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on a particular application and a design constraint of the technical solutions. Persons skilled in the art may use different methods to implement the described functions for each particular application, but it should not be considered that the implementation goes beyond the scope of this application.

In embodiments of this application, a device may be divided into functional modules based on the foregoing method examples. For example, functional modules may be divided corresponding to the functions, or two or more functions may be integrated into one module. The integrated module may be implemented in a form of hardware, or may be implemented in a form of a software functional module. It should be noted that, in embodiments of this application, division into the modules is an example and is merely logical function division, and may be other division in an actual implementation.

Figure 13:
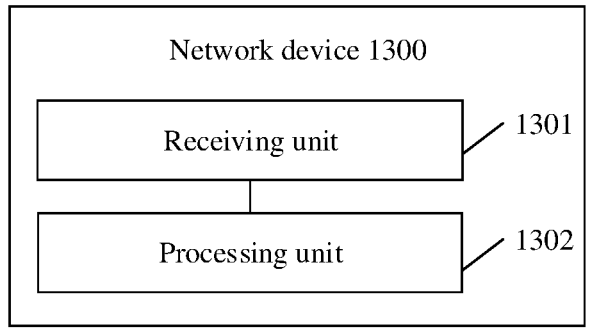
FIG. 13 is a schematic diagram of a logical structure of a network device according to an embodiment of this solution.

In a case in which functional modules are divided corresponding to the functions, FIG. 13 is a schematic diagram of a possible logical structure of a device. The device may be the network device described above. The network device 1300 includes a receiving unit 1301 and a processing unit 1302.

The receiving unit 1301 is configured to receive a message sent by a controller, where the message includes type information and a segment identifier, and the type information is used to indicate that the segment identifier is a binding segment identifier BSID.

The processing unit 1302 is configured to perform a processing action on the BSID based on the type information.

In a possible implementation, the processing unit 1302 is specifically configured to: check, based on the type information, whether a route to a device indicated by the BSID exists, and skip checking whether the BSID exists in a topology to which the network device belongs; or skip, based on the type information, performing failure check on the BSID.

In a possible implementation, the message further includes a segment identifier SID, and the SID is a segment identifier of a type different from a type of the BSID; and the network device 1300 further includes:

a check unit, configured to check, based on the type of the SID, whether a route to a device indicated by the SID exists, and check whether the SID exists in the topology to which the network device belongs.

Figure 14:
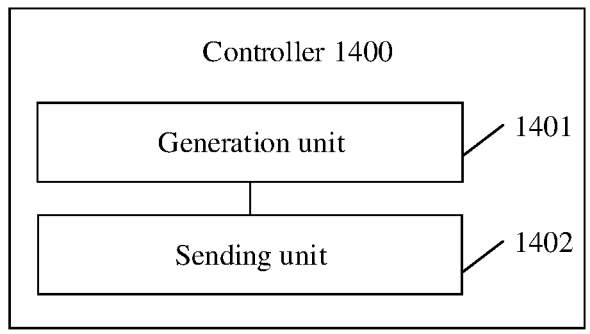
FIG. 14 is a schematic diagram of a logical structure of a controller according to an embodiment of this solution.

In a case in which functional modules are divided corresponding to the functions, FIG. 14 is a schematic diagram of a possible logical structure of a device. The device may be the controller described above. The controller 1400 includes a generation unit 1401 and a sending unit 1402.

The generation unit 1401 is configured to generate a message, where the message includes type information and a segment identifier, and the type information is used to indicate that the segment identifier is a binding segment identifier BSID.

The sending unit 1402 is configured to send the message to a network device.

For specific operations and beneficial effects of units in the devices shown in FIG. 13 and FIG. 14, refer to the descriptions of the foregoing method embodiment shown in FIG. 2. Details are not described herein again.

Figure 15:
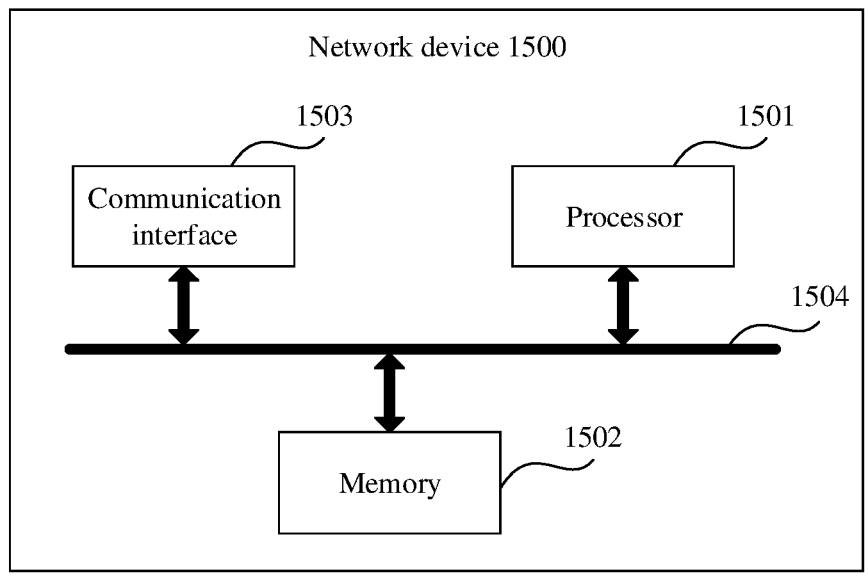
FIG. 15 is a schematic diagram of a hardware structure of a network device according to an embodiment of this solution.

FIG. 15 is a schematic diagram of a possible hardware structure of a device according to this application. The device may be the network device in the foregoing method embodiment. The network device 1500 includes a processor 1501, a memory 1502, and a communication interface 1503. The processor 1501, the communication interface 1503, and the memory 1502 may be connected to each other or connected to each other by using a bus 1504.

For example, the memory 1502 is configured to store a computer program and data of the device 1500, and the memory 1502 may include but is not limited to a random access memory (RAM), a read-only memory (ROM), an erasable programmable read-only memory (EPROM), or a compact disc read-only memory (CD-ROM). The communication interface 1503 is configured to support the network device 1500 for communication, for example, receiving or sending data.

For example, the processor 1501 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors or a combination of a digital signal processor and a microprocessor. The processor 1501 may be configured to read the program stored in the memory 1502, to perform the operations performed by the network device in the method in FIG. 2 and the possible implementations.

Figure 16:
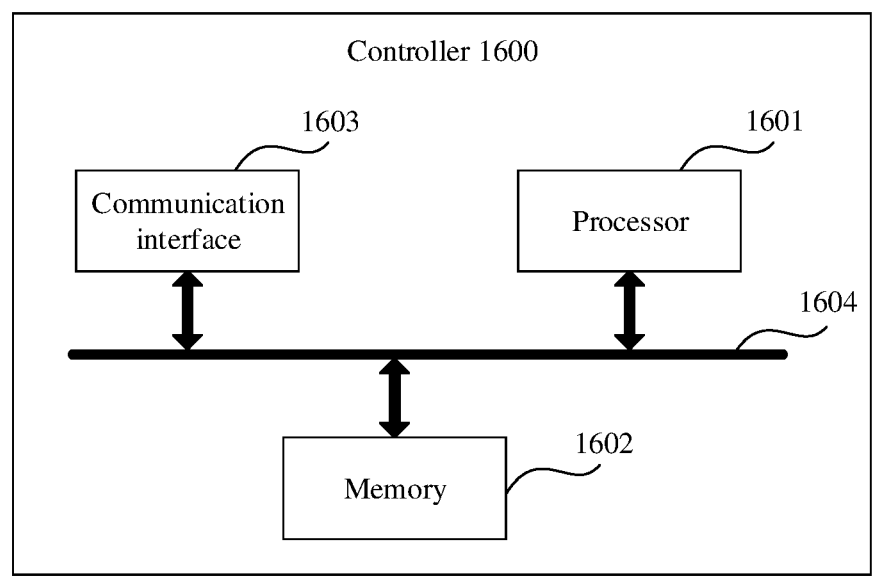
FIG. 16 is a schematic diagram of a hardware structure of a controller according to an embodiment of this solution.

FIG. 16 is a schematic diagram of a possible hardware structure of a device according to this application. The device may be the controller in the foregoing method embodiment. The controller 1600 includes a processor 1601, a memory 1602, and a communication interface 1603. The processor 1601, the communication interface 1603, and the memory 1602 may be connected to each other or connected to each other by using a bus 1604.

For example, the memory 1602 is configured to store a computer program and data of the device 1600, and the memory 1602 may include but is not limited to a random access memory (RAM), a read-only memory (ROM), an erasable programmable read-only memory (EPROM), or a compact disc read-only memory (CD-ROM). The communication interface 1603 is configured to support the controller 1600 for communication, for example, receiving or sending data.

For example, the processor 1601 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors or a combination of a digital signal processor and a microprocessor. The processor 1601 may be configured to read the program stored in the memory 1602, to perform the operations performed by the controller in the foregoing method.

An embodiment of this application further provides a binding segment identifier processing system. The system includes a network device and a controller. The network device is the network device in the foregoing method embodiment of FIG. 2, and the controller is the controller in the foregoing method embodiment of FIG. 2. Alternatively, the network device is the network device in FIG. 13, and the controller is the controller in FIG. 14. Alternatively, the network device is the network device in FIG. 15, and the controller is the controller in FIG. 16.

An embodiment of this application further discloses a computer-readable storage medium. The computer-readable storage medium stores a computer program, and the computer program is executed by a processor to implement the method in FIG. 2 and the possible implementations.

An embodiment of this application further discloses a computer program product. When the computer program product is read and executed by a computer, the method in FIG. 2 and the possible implementations are performed.

An embodiment of this application further discloses a computer program. When the computer program is executed on a computer, the computer is enabled to implement the method in FIG. 2 and the possible implementations.

In conclusion, in this application, the type of the BSID is specified in the delivered message, so that the network device can identify the BSID in the segment routing policy, and can further process the BSID based on the processing action corresponding to the type, thereby avoiding an incorrect processing result caused by incorrect or improper processing performed because the BSID cannot be identified.

Finally, it should be noted that the foregoing embodiments are merely intended for describing other than limiting the technical solutions of this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A segment routing policy advertising method, comprising:
receiving, by a network device, a message sent by a controller, wherein the message comprises one or more candidate paths of a Segment Routing (SR) policy and a sub type length value (sub-TLV), wherein the sub-TLV comprises type information and a segment identifier (SID), wherein the SID is one SID of a segment list indicating the one or more candidate path, and wherein the type information indicates that the SID is a binding segment identifier (BSID); and
storing, by the network device, the segment list;
wherein the method further comprises:
skipping checking whether the BSID exists in a topology to which the network device belongs; or
skipping, by the network device, based on the type information, performing a failure check on the BSID.

2. The method according to claim 1, wherein a type field in the message comprises the type information.

3. The method according to claim 1, wherein a flags field in the message comprises the type information.

4. The method according to claim 3, wherein the type information occupies at least four bits in the sub-TLV.

5. The method according to claim 1, wherein the method further comprises:
checking, by the network device, based on the type information, whether a route to a device indicated by the BSID exists.

6. The method according to claim 1, wherein the message comprises a border gateway protocol (BGP) message.

7. The method according to claim 1, wherein the message comprises a path computation element communication protocol (PCEP) message.

8. A segment routing policy advertising method, comprising:
generating, by a controller, a message, wherein the message comprises one or more candidate paths of a Segment Routing (SR) policy and a sub type length value (sub-TLV), wherein the sub-TLV comprises type information and a segment identifier (SID), wherein the SID is one SID of a segment list indicating the one or more candidate path, and wherein the type information indicates that the SID is a binding segment identifier (BSID); and
sending, by the controller, the message to a network device;
wherein the network device skips checking whether the BSID exists in a topology to which the network device belongs; or
wherein the network device skips, based on the type information, performing a failure check on the BSID.

9. The method according to claim 8, wherein a type field in the message comprises the type information.

10. The method according to claim 8, wherein a flags field in the message comprises the type information.

11. The method according to claim 10, wherein the type information occupies at least four bits in the sub-TLV.

12. The method according to claim 8, wherein the message comprises a border gateway protocol (BGP) message.

13. The method according to claim 8, wherein the message comprises a path computation element communication protocol (PCEP) message.

14. A controller, comprising:
at least one processor; and
one or more non-transitory computer-readable storage mediums storing a program to be executed by the at least one processor, the program including instructions to:
  generate a message, wherein the message comprises one or more candidate paths of a Segment Routing (SR) policy and a sub type length value (sub-TLV), wherein the sub-TLV comprises type information and a segment identifier (SID), wherein the SID is one SID of a segment list indicating the one or more candidate path, and wherein the type information indicates that the SID is a binding segment identifier (BSID); and
  send the message to a network device;
  wherein the network device skips checking whether the BSID exists in a topology to which the network device belongs; or
  wherein the network device skips, based on the type information, performing a failure check on the BSID.

15. The controller according to claim 14, wherein a type field in the message comprises the type information.

16. The controller according to claim 14, wherein a flags field in the message comprises the type information.

17. The controller according to claim 16, wherein the type information occupies at least four bits in the flags field.

18. The controller according to claim 14, wherein the message comprises a border gateway protocol (BGP) message.

19. The controller according to claim 14, wherein the message comprises a path computation element communication protocol (PCEP) message.

20. A network device, comprising:
at least one processor; and
one or more non-transitory computer-readable storage mediums storing a program to be executed by the at least one processor, the program including instructions to:
  receive a message sent by a controller, wherein the message comprises one or more candidate paths of a Segment Routing (SR) policy and a sub type length value (sub-TLV), wherein the sub-TLV comprises type information and a segment identifier (SID), wherein the SID is one SID of a segment list indicating the one or more candidate path, and wherein the type information indicates that the SID is a binding segment identifier (BSID); and
  store the segment list;
  wherein the instructions further include instructions to:
    skip checking whether the BSID exists in a topology to which the network device belongs; or
    skip performing a failure check on the BSID.

21. The network device according to claim 20, wherein the instructions further include instructions to:
check, based on the type information, whether a route to a device indicated by the BSID exists.

* * * * *